Oct. 19, 1954    A. M. OLSON    2,692,200
APPARATUS FOR AND METHOD OF BLANCHING VEGETABLES
Filed Sept. 26, 1950    2 Sheets-Sheet 2

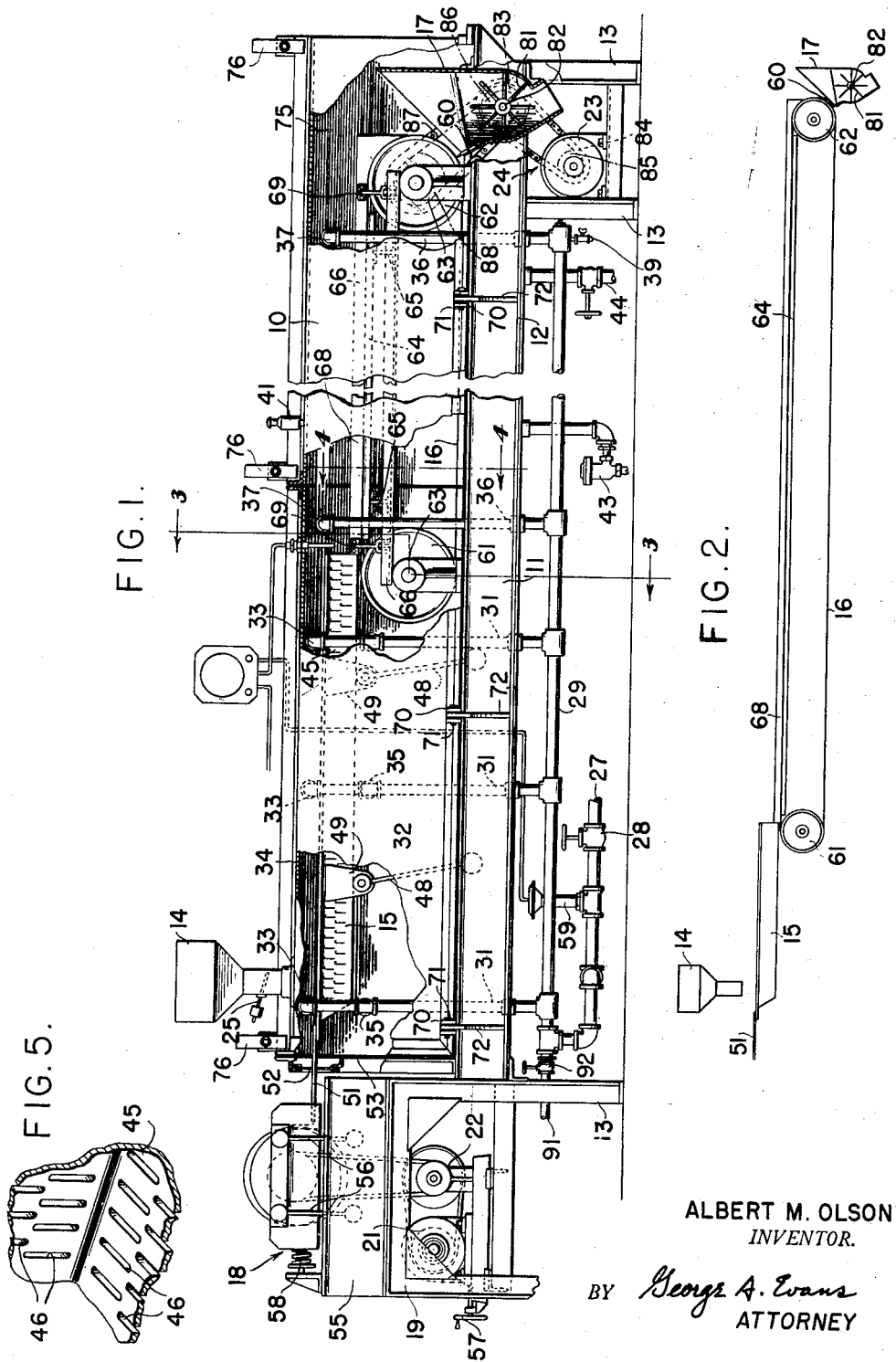

ALBERT M. OLSON
INVENTOR.
BY George A. Evans
ATTORNEY

Patented Oct. 19, 1954

2,692,200

UNITED STATES PATENT OFFICE 2,692,200

APPARATUS FOR AND METHOD OF BLANCHING VEGETABLES

Albert M. Olson, Wauwatosa, Wis., assignor to Chain Belt Company, Milwaukee, Wis., a corporation of Wisconsin Application September 26, 1950, Serial No. 186,825

5 Claims. (Cl. 99—103)

This invention relates, generally, to the treatment of food products preparatory to preserving them, and more particularly to the preliminary heat treating or blanching of vegetables.

Blanching of certain vegetables in preparation for preserving them is effected for the purpose of expelling gases from their cells, inactivating enzymes, additionally cleansing them to eliminate bacteria and foreign matter and otherwise influencing their tissues to improve the appearance, tenderness and flavor of the final product.

As ordinarily practiced heretofore, the process of blanching has been effected by hot water and was responsible for considerable sacrifice of nutrients from vegetable products through the extraction of water soluble vitamins and minerals and the thermal destruction of some vitamins. Furthermore, blanchers as heretofore employed have constituted a primary source of bacteriological contamination since they were difficult to clean and to maintain in sanitary condition, and when idle were likely to remain at a temperature favoring the growth of thermophilic bacteria.

It is a general object of the present invention to provide improved apparatus for and method of blanching vegetables under favorable sanitary conditions and in a manner to minimize the loss of nutrients therefrom.

Another object of the invention is to provide an improved blancher in which vegetable particles are subjected to the action of steam on all surfaces for quickly heating them and are held at the temperature of the steam for a predetermined period of time to blanch them uniformly.

Another object of the invention is to provide an improved method of continuous blanching wherein vegetable products may be quickly and uniformly heated to a sufficiently high temperature to enable the desired heat treatment to be effected in a short time thereby favoring the retention of vitamins in the product and improving the nutritional qualities thereof.

Another object is to provide an improved method of blanching wherein vegetable particles are tossed in the presence of steam to present all surfaces thereof uniformly to the heating action of the steam and are retained in the presence of the steam for a predetermined period of time to blanch them uniformly.

Another object is to provide an improved steam blanching apparatus for vegetable particles wherein a vibrating conveyer is utilized to toss and advance the particles in the presence of steam in a manner to expose all of their surfaces to the steam to heat them uniformly and a continuously moving conveyer is then utilized to advance the heated particles in a manner to subject them uniformly to the blanching effect of the steam for a predetermined period of time.

Another object is to provide an improved blancher in which all parts in contact with the product being blanched are maintained at a temperature above that at which bacteria are likely to develop.

Another object is to provide an improved blancher that may either be maintained at high temperature during idle periods to prevent multiplication of bacteria or that may be cooled rapidly to a temperature below that favoring the growth of bacteria.

Another object is to provide improved blanching apparatus all parts of which may be easily and rapidly cleaned to maintain the apparatus in sanitary condition.

According to this invention, vegetable material to be blanched is introduced in the form of particles into the presence of a gaseous heating medium and the particles tossed or agitated therein in a manner to expose all surfaces thereof to the heating medium for effecting quick and uniform heating of the material. After the material has been heated to the desired temperature, the agitation is discontinued and the particles are then retained in the presence of the heating medium in quiescent state for a predetermined period of time to blanch the material uniformly. By thus quickly and uniformly heating the material and maintaining it at a predetermined temperature for a precise period of time, the blanching operation is effected with minimum loss of nutrients from the vegetable material and with maximum beneficial effect upon the product.

The improved blanching operation may be accomplished by means of apparatus having a steam chamber wherein vegetable particles are advanced by means of a vibrating conveyer which feeds them through the steam with a tossing movement until they are heated closely to the temperature of the steam. The particles are then fed onto a continuously moving conveyer that advances them through the steam chamber for the predetermined blanching time. The particles are preferably fed into the steam chamber through an entrance valve that prevents the escape of steam from the chamber and are discharged out of the chamber through a similarly operating discharge valve. The valves enable steam in the chamber to be maintained at somewhat above atmospheric pressure if desired to increase the heating effect. At the end of operations, cold water may be introduced through the steam pipes to cool the apparatus quickly below the temperature favoring the growth of bacteria.

The foregoing and other objects of the invention will become more fully apparent from the following detailed description when taken in conjunction with the accompanying drawings, in which:

Fig. 1 is a view in side elevation of a vegetable blanching machine arranged to operate in accordance with the principles of the present invention, parts of the machine having been broken away to shorten the illustration and to better disclose the internal construction;

Fig. 2 is a diagrammatic view on a reduced scale of the conveyers incorporated in the machine shown in Fig. 1;

Figures 3, 4:
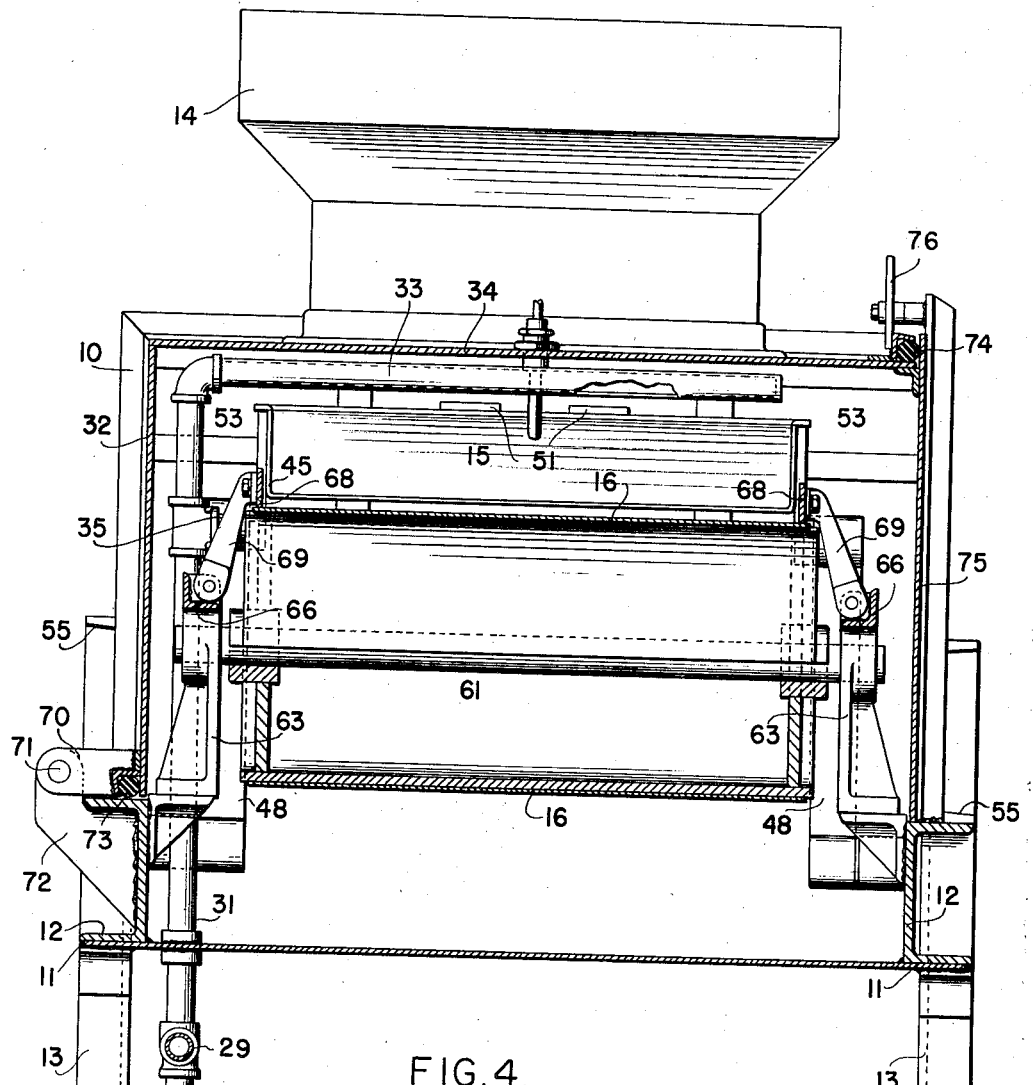
Fig. 3 is an enlarged view in transverse section through the machine, taken on the plane represented by the line 3—3 in Fig. 1.
Fig. 4 is a view in transverse section through the belt conveyer mechanism, taken on the plane represented by the line 4—4 in Fig. 1; and, Fig. 5 is an enlarged fragmentary view in perspective showing in detail part of the bottom and one side of the vibrating conveyer to illustrate an arrangement of slots therein.

Referring more specifically to the drawings and particularly to Figs. 1 and 2 thereof, the apparatus there shown is an improved continuous steam blancher constituting a preferred embodiment of the present invention, although it is to be understood that other structures for practicing the improved blanching operation may take various forms within the scope of the invention as defined in the claims.

As shown in Fig. 1, the blanching mechanism comprises essentially an elongated rectangular housing 10 constituting a steam chamber disposed horizontally upon a supporting frame 11 formed by longitudinal beams or channels 12 mounted at spaced positions on vertical supporting legs 13. Vegetable material to be blanched is introduced into the housing 10 in the form of particles (for example, peas or beans) through an inlet hopper 14 mounted on the top of the housing at the left or entrance end thereof. Particles fed through the hopper 14 fall upon the receiving end of a relatively short vibrating or shaking conveyer 15 mounted for reciprocating movement within the first portion or zone of the housing 10. The short shaking conveyer 15 discharges the particles onto a relatively long continuously moving belt conveyer 16 in the second portion or zone of the housing, best illustrated in Fig. 2, that moves them toward the right or discharge end of the housing 10 where they are dropped from the end of the conveyer into a discharging hopper 17 and are ejected therethrough out of the housing 10.

The shaking conveyer 15 is driven by a vibrating shaker mechanism 18 that is mounted externally of the housing 10 adjacent to its inlet end on an outwardly extending bracket portion 19 of the frame 11. The shaker mechanism 18 is driven by a motor 21 connected to it by means of a variable speed transmission mechanism 22. For driving the belt conveyer, there is provided at the other end of the machine a variable speed motor 23 disposed beneath the discharge end of the housing 10 and operatively connected to drive the belt 16 by means of a transmission mechanism 24.

Although the blancher is adapted to operate upon various food products in the form of loose pieces or particles, it is particularly suitable for use in blanching peas. Before being blanched, the peas are washed to remove extraneous matter, after which they are fed into the inlet hopper 14 that is preferably of stainless steel or equivalent material and constitutes a substantially steam sealed feeding means. Within the hopper 14, the peas fall upon a counterbalanced shutoff gate valve or damper 25 arranged to be automatically closed to prevent the escape of steam from the housing 10 and that opens under the weight of the peas to permit them to fall onto the vibrating conveyer 15. As best shown in Fig. 3, the hopper 14 is of sufficient width transversely of the housing 10 to distribute the peas evenly across the full width of the vibrating conveyer at its receiving end.

Steam for blanching the peas is admitted into the housing 10, both above and below the conveyer 15 through a system of piping connected with a source of steam represented by a supply pipe 27, from which steam may be admitted through a valve 28 to a steam header 29 disposed longitudinally beneath the housing 10. From the header 29, riser pipes 31 extend upwardly within the housing 10 (as shown in Fig. 3) between the left wall 32 of the housing and the adjacent edge of the shaking conveyer 15. The upper end of each riser pipe 31 is connected by an elbow to a horizontally disposed nozzle pipe 33 that extends transversely of the housing 10 just beneath the top panel 34 thereof and above the conveyer 15. The nozzle pipes are provided with suitable discharge orifices in the form of longitudinal slots as shown in Fig. 3 through which steam may be discharged downwardly into the region of the housing above the conveyer 15. A second parallel set of nozzle pipes 35 are disposed transversely of the housing 10 beneath the conveyer 15 and are connected to the riser pipes 31 by T's the nozzle pipes 35 being arranged to project steam upwardly in the region below the conveyer 15.

Similar riser pipes 36 are provided at the side of the belt conveyer 16. However, each of the riser pipes 36 is provided with only one transverse nozzle pipe 37 that extends across the housing 10 above the conveyer belt in position to furnish steam to the upper region only in that part of the housing. A drain or blowoff valve 39 is provided at the end of the steam header 29 opposite from the inlet valve 28 for draining water from the steam pipes when steam is first admitted, thereby facilitating the unrestricted flow of steam into the housing 10 for rapidly heating the apparatus to operating temperature. In order that air within the housing may escape when the steam is admitted, a vent pipe or air eliminating thermostatic trap valve 41 is provided in the top 34 of the housing 10, the valve being of the type that closes automatically to prevent the escape of steam through the vent after the air has escaped. Water formed by condensation of steam within the housing 10 gravitates to the bottom of the housing and may be drained away through a thermostatic steam trap 43 or through a manually actuated drain valve 44.

As best shown in Fig. 2, the vibrating conveyer 15 constitutes about one-fifth of the combined length of the two conveyers 15 and 16. The conveyer 15 comprises a perforate bed constituted by a comparatively shallow feeder or pan 45 formed preferably of stainless steel or the like and perforated as shown in Fig. 5 by a series of staggered slots 46 disposed transversely in the bottom of the pan and vertically in the sides thereof. Each slot may be three or four inches long and of a width somewhat less than the thickness of the peas or other material being blanched in order that the particles of material will not escape through them. When the blancher is in operation, steam from the lower nozzle pipes 35 passes through the slots 46 in the pan 45 to intermingle with the peas as they are fed along the conveyer. Likewise, water resulting from condensation of the steam on the peas drains away through the slots 46 as it is shaken from the peas by the vibratory action. Furthermore, the slots 46 facilitate feeding movement of the peas along the conveyer since they engage some of the peas and assist in throwing them upward and forward as the conveyer reciprocates.

As best shown in Fig. 1, the conveyer 15 is supported upon four shaker arms or eye bars 48 that are connected at their lower ends by means of rubber cushioned mountings to the inner surfaces of the frame channels 12, the arms being arranged in two pairs supporting, respectively, the receiving and the discharging ends of the conveyer. The arms 48 of each pair are attached at their upper ends by means of rubber cushioned mountings, to brackets 49 fastened to the opposite sides of the conveyer pan 45. As shown, the arms 48 are preferably disposed at an angle of about twenty degrees to the vertical in order to give a forward and upward movement to the peas in the pan 45 when the conveyer is vibrating.

At its receiving end, the pan 45 is connected to a driving plate or strap 51 that extends through a flexible curtain 52 in the entrance end wall 53 of the housing 10 and is connected to the shaker mechanism 18. As appears in Fig. 1, the shaker mechanism 18 is supported on the bracket 19 in a cradle 55 by means of vertically disposed shaker arms 56 in a manner to permit shaking movement thereof in the direction of the longitudinal shaking movement of the conveyer 15. The vibratory movement of the shaker mechanism 18 is effected by means of a rotating unbalanced weight that is driven by the variable speed mechanism 22, a suitable hand crank 57 being provided for adjusting the drive mechanism 22 to regulate the speed of rotation and thereby the frequency of the vibration transmitted to the conveyer 15. A relatively heavy spring 58 is interposed between the cradle 55 and the shaker unit 18 at the side thereof opposite to its connection with the driving strap 51 for counterbalancing the tendency of the shaker pan to move downward and endwise toward the shaker unit under the gravity force component resulting from the inclined position of the pan supporting shaker arms 48.

When the vibratory conveyer 15 is operating at the proper speed as established by adjusting the transmission mechanism 22 by means of the hand wheel 57, the peas in the pan 45 will be tossed upwardly and forwardly by the vibratory feeding movement, with the assistance of the slots 46, in the desired manner. When thus properly tossed or bounced, all of the surfaces of all of the peas are exposed uniformly to the steam flowing from the nozzle pipes 33 and 35 and permeating the agitated mass of peas both directly from above and from below through the slots 46 in the pan 45. The amount of steam admitted to the chamber through the nozzle pipes may be regulated automatically by a temperature controlling valve mechanism 59 interposed between the supply pipe 27 and the header 29 and that may be of any well known type serving to maintain the interior of the housing 10 at a predetermined temperature. Alternatively, the steam may be regulated manually by adjusting the valve 28 in the supply pipe 27. In either event, the flow of steam is ample to insure that all of the peas are uniformly heated to a desired temperature during the feeding movement thereof from the entrance end to the discharge end of the vibrating conveyer pan 45. At the discharge end of the shaking conveyer, the uniformly heated peas are discharged onto the continuously moving conveyer 16 which in this instance is constituted by an endless belt, preferably formed from an imperforated sheet of stainless steel or similar material. The peas come to rest upon the surface of the belt 16 in quiescent state in the form of a mat or blanket of substantially uniform thickness of the order of two inches or so and are maintained at the desired temperature by the steam flowing from the nozzle pipes 37 above the belt while the blanching operation is completed. Since the peas have already been heated, very little additional heat is required to maintain them at the predetermined blanching temperature and consequently comparatively little water collects upon the belt as the result of condensation of steam. The length of time during which the peas are subjected to the blanching influence of the steam may be regulated by changing the speed of the belt 16 through suitably adjusting the variable speed motor 23 which actuates the transmission mechanism 24 that drives the belt. Since the peas repose in quiescent state upon the belt 16, the length of time during which they are subjected to the blanching influence is the same for all of the peas thus insuring that the blanching action will be uniform throughout the mass of peas as they are moved along by the belt 16 to the discharge hopper 17.

In accordance with the improved method of blanching provided by the present invention, the peas or other particles being blanched are agitated and tossed in an atmosphere of steam in a manner adapted to expose all surfaces of all of the particles to the influence of the steam for heating them quickly and uniformly. This agitating or tossing action is continued only long enough to heat the particles to a desired temperature which may be close to the temperature of the steam. The particles then are held in quiescent state in the presence of the steam for a predetermined time in a manner adapted to subject all of the particles uniformly to the blanching action. Although the tossing or agitating action is accomplished in the particular apparatus set forth herein by means of the short vibrating conveyer 15 and the particles are held in quiescent state for the predetermined blanching time on the relatively long continuously moving belt 16, it is to be understood that the new method of blanching herein described may be practiced by any other suitable means whereby the particles are first tossed in a heating medium to heat them quickly and uniformly and are then held in quiescent state for a measured time to subject them uniformly to the blanching influence of the medium. In the apparatus set forth herein, it is apparent that the peas are quickly and uniformly heated while on the vibrating conveyer 15 and uniformly blanched while on the belt conveyer 16, the entire operation being performed expeditiously with minimum loss of nutrients.

As a specific example, in the apparatus as arranged for blanching peas, steam for blanching the peas is admitted to the housing 10 at slightly over atmospheric pressure to maintain a temperature of about 212° F. in the steam chamber. The peas are subjected to the blanching influence of the steam for a total time of about three minutes while traveling the length of the housing 10. During this time the peas are agitated on the vibrating conveyer for about one-fifth the total time, or in other words for about thirty to forty seconds and then fall onto the belt conveyer where they remain quiescent for the balance of the time they are traversing the length of the belt conveyer.

Various kinds and grades of peas require somewhat different time schedules for both the heating and the blanching phases and may be accommodated by suitably adjusting the shaker mechanism 18 and the variable speed belt driving motor 23. Furthermore, it will be apparent that other products to be blanched may require quite different time schedules with the result that machines designed for blanching them in accordance with the present invention may be of different proportions from the machine shown in the drawings.

As the peas arrive at the discharge end of the belt conveyer 16 in uniformly blanched condition, they fall from the belt into the discharge hopper 17. Any peas or parts of peas which may adhere to the belt as it starts its return run from the hopper are scraped from its surface by a scraper blade 60 mounted on the inner edge of the hopper 17 and likewise fall into the hopper.

As shown in the drawings, the endless conveyer belt 16 operates over a pair of pulleys or rollers 61 and 62 at the receiving and the discharge ends, respectively, of the belt run, the pulleys each being journalled at each end in a supporting bearing bracket 63 upstanding from the adjacent frame channel 12. The pulley 62 at the discharge end is operatively connected to be driven by the transmission mechanism 24. Either of the pulleys 61 or 62 may be of the self-aligning type which operate automatically to maintain the stainless steel belt 16 in proper alignment as it runs over the pulleys.

As best shown in Fig. 4, the upper run of the belt which carries the peas is supported from below adjacent to its edges by bearing strips 64 that may be of wood or other suitable material, and that are supported at intervals by brackets 65 extending upwardly and inwardly from parallel supporting bars or angles 66 that are mounted on and extend between the bearing brackets 63 at each side of the belt 16. In order to retain the blanket of peas on the top of the belt 16 and prevent them from escaping over the edges of the belt, edge guides or sideboards 68 (see Fig. 3) are disposed in vertical position on top of and just inwardly from the edges of the belt. The edge guides 68 also may be of wood or similar material and are carried by upwardly extending bracket arms 69 which are pivotally mounted at their lower ends on the angle bars 66, the arrangement being such that the edge guides may be pivotally displaced upwardly and outwardly from the belt in order to expose both the guides and the belt edges for thorough cleaning when the machine is opened after it has been operating.

In order that access may be had readily to the interior of the machine for cleaning the conveyors, the side wall 32 and top panel 34 of the housing 10 are joined together as a unit separate from the remainder of the housing to constitute a hood or cover that may be tilted upwardly to expose the conveyers. As shown in Fig. 3, the side wall 32 is provided at its lower edge with outwardly extending hinge bars 70 that are pivoted at their outer ends by means of pivot pins 71 to the upper ends of cooperating hinge brackets 72 extending outwardly from the frame side channel 12. In order to prevent the escape of steam from the housing when the hood is closed, a packing or sealing strip 73 is provided on the lower edge of the sideplate 32 for engagement with the top of the channel 12 in the manner shown in Fig. 3. Likewise, a similar packing or sealing strip 74 is provided at the free edge of the top panel 34 for sealing engagement with the top of the stationary side wall 75 constituting the other side of the housing 10. Suitable clamps 76 are provided along the top of the side wall 75 for engaging the sealing edge of the top panel 34 to clamp the hood in closed position with the sealing strips 73 and 74, which are of resilient packing material, sealing the joints between the hood and the stationary parts of the housing. When the clamps 76 are released, the entire hood comprised of the side wall 32 and the top panel 34 together with the hopper 14 and other attachments thereon, may be pivoted upwardly and outwardly about the pivot pins 71 on the hinge brackets 72 to completely expose the interior of the housing 10 and the apparatus contained therein to provide full accessibility for thorough cleansing of the parts contacted by the material being blanched.

As shown in Fig. 1, the discharge hopper 17 likewise is provided with substantially steam sealed means for preventing the escape of steam during processing, in the form of a steam trap constituted by a bladed paddle wheel or spider wheel 81 that is carried by a horizontally journalled transverse shaft 82 extending through the hopper 17 from side to side. The shaft 82 is provided externally of the hopper with a sprocket 83 that is engaged by a chain 84 that runs over a sprocket 85 on the shaft of the variable speed driving motor 23, the apparatus constituting part of the transmission mechanism 24. A second sprocket 86 on the shaft 82 engages a chain 87 which runs over a sprocket 88 connected to the belt driving pulley 62. The arrangement of the chains and sprockets in the transmission mechanism 24 is such that the paddle wheel 81 is driven in synchronism with the conveyer belt 16 but somewhat faster than necessary to handle the quantity of peas discharged from the belt. Accordingly, the various pockets of the paddle wheel are filled only to about two-thirds of their capacity. This permits the peas to be retained in the inner parts of the wheel pockets in such manner that they are carried around by the wheel from the upper to the lower part of the hopper 17 without danger of crushing any of them between the ends of the wheel blades and the cooperating walls of the hopper. As may be seen in the drawing, the periphery of the spider wheel engages concave arcuate elements of the walls of the hopper 17 in a manner to prevent the escape of steam past the ends of the wheel blades.

At the end of a blanching operation upon a run of peas or the like, the conveyers may be stopped by deenergizing the motors 21 and 23 after the last of the peas have been discharged through the hopper 17. The spider wheel 81 will then constitute a closure means or steam retainer for the hopper 17 and the counterbalanced shutoff valve 25 will close the inlet hopper 14 in such a manner that steam may be maintained within the housing 19 until the machine is again started, in order to maintain the interior at high temperature thereby preventing the growth of bacteria. When the apparatus is to be shut down for an appreciable period of time, the steam is turned off by closing the inlet valve 28 and cold water is admitted through the steam pipes from a supply pipe 91 by opening a valve 92 leading therefrom into the header 29, the water being sprayed through the nozzle pipes throughout the interior of the housing 10. This results in cooling the apparatus quickly from steam temperature down to room temperature in order that the machine may not be left standing for an appreciable time at a temperature within the range of temperatures favorable to the growth of thermophilic bacteria. After the interior of the housing has been cooled in this manner, the clamps 76 are released and the hood is tilted to open position to expose the interior for thorough cleaning.

From the forgoing explanation of the operation of the improved blanching apparatus herein set forth, it is apparent that there has been provided by the present invention, a new method of blancing and new apparatus therefor, whereby the vegetable particles being blanched are tossed in steam to heat them quickly and uniformly and are held in the presence of the steam under highly sanitary conditions for sufficient time to blanch them uniformly, thereby favoring the retention of nutrients and otherwise improving the quality of the final product.

Although a specific embodiment of the invention has been described in detail by way of a disclosure of the presently preferred apparatus for practicing the invention, it is to be understood that the improved apparatus herein set forth constitutes an exemplification of the invention and may be changed and modified and that the new method may be practiced by other apparatus, without departing from the spirit and scope of the invention as defined in the subjoined claims.

The invention having now been described, I claim as my invention:

1. A continuous blanching mechanism comprising an elongated housing, a vibrating conveyor having a perforate bed mounted within the first portion of said housing, substantially steam sealed feeding means connected to said housing to feed fresh peas and similar solid particle fresh vegetables to said conveyor, means to admit steam into said first portion of said housing and through said perforate conveyor bed, vibrating mechanism connected to said conveyor whereby said conveyor will advance the vegetables therealong by a tossing movement, a continuously advancing conveyor mounted in a second portion of said housing, and disposed to receive the vegetables which have been heated to a blanching temperature while in continuous tossing motion in said first portion of said housing, variable drive means connected to said second conveyor to advance said second conveyor and impart a quiescent progressive movement to said vegetables, means to admit steam to said second portion of said housing to maintain the blanching temperature therein, substantially steam sealed means for removing said vegetables after they have been maintained at the blanching temperature by quiescent movement through said second portion of said housing, and means to adjust the rate of advance of said conveyors with respect to each other, such that the vegetables are maintained in quiescent movement at the blanching temperature for a major period of time with respect to the time required to reach a blanching temperature.

2. Mechanism as set forth in claim 1 characterized by having the vibrating mechanism mounted externally of the housing whereby the rate of movement of the vibrating conveyor can be adjusted while the vegetables are being blanched.

3. Mechanism as set forth in claim 1 wherein the perforations in said vibrating conveyor bed are transverse slots which engage the vegetables and assist in tossing and advancing them as specified.

4. A continuous blanching method comprising introducing solid particle vegetables such as fresh peas into an enclosed space, advancing the vegetables when so introduced through a first zone in said space by a tossing movement, simultaneously admitting steam to said zone to surround the vegetables while they are being tossed and to bring them rapidly to blanching temperature, thereafter advancing said vegetables in a second zone in said space while they are in a relatively quiescent state, admitting steam to said second zone to maintain the vegetables while advanced therein at the required blanching temperature, controlling the rate of advance of the vegetables in the two zones such that the vegetables are maintained in quiescent movement at the blanching temperature for a major portion of the time in which they are subjected to steam, and finally removing the blanched vegetables from the second zone of said space.

5. A method as set forth in claim 4 wherein the vegetable being blanched is peas, comprising admitting steam into both zones at slightly in excess of atmospheric pressure and subjecting the peas to the steam for a total time of the order of three minutes, the period of time in which they are tossed in the first zone being less than one minute.

References Cited in the file of this patent

UNITED STATES PATENTS

| Number | Name | Date |
|---|---|---|
| 1,839,671 | Hale | Jan. 5, 1932 |
| 1,922,783 | Schmidt | Aug. 15, 1933 |
| 2,213,623 | Choppin et al. | Sept. 3, 1940 |
| 2,373,521 | Wigelsworth | Apr. 10, 1945 |
| 2,403,871 | McBean | July 9, 1946 |
| 2,418,519 | McBeth | Apr. 8, 1947 |
| 2,522,513 | Hemmeter | Sept. 19, 1950 |

FOREIGN PATENTS

| Number | Country | Date |
|---|---|---|
| 175,376 | Great Britain | Feb. 13, 1922 |